United States Patent
Kim et al.

(10) Patent No.: US 11,475,521 B2
(45) Date of Patent: Oct. 18, 2022

(54) SYSTEM AND METHOD FOR PAYMENTS IN FINANCIAL INSTRUMENT'S TRADE

(71) Applicant: Aura7 USA Inc., Henderson, NV (US)

(72) Inventors: Richard Kim, Henderson, NV (US); Choi In-Ki, Kyunggi-do (KR)

( * ) Notice: Subject to any disclaimer, the term of this patent is extended or adjusted under 35 U.S.C. 154(b) by 0 days.

(21) Appl. No.: 17/212,646

(22) Filed: Mar. 25, 2021

(65) Prior Publication Data

US 2021/0312548 A1     Oct. 7, 2021

Related U.S. Application Data

(60) Provisional application No. 63/134,853, filed on Jan. 7, 2021.

(51) Int. Cl.
| | |
|---|---|
| *G06Q 40/04* | (2012.01) |
| *G06Q 20/06* | (2012.01) |
| *G06Q 50/18* | (2012.01) |
| *G06Q 20/38* | (2012.01) |
| *G06F 3/0482* | (2013.01) |

(52) U.S. Cl.
CPC ......... *G06Q 40/04* (2013.01); *G06Q 20/0655* (2013.01); *G06Q 20/381* (2013.01); *G06Q 50/188* (2013.01); *G06F 3/0482* (2013.01)

(58) Field of Classification Search
CPC .... G06Q 40/04; G06Q 20/381; G06Q 50/188; G06Q 20/0655; G06F 3/0482
See application file for complete search history.

(56) References Cited

U.S. PATENT DOCUMENTS

| | | | | |
|---|---|---|---|---|
| 8,321,327 | B1 * | 11/2012 | Drennan ............... | G06Q 40/06 705/37 |
| 2004/0236665 | A1 * | 11/2004 | Negishi ............... | G06Q 40/04 705/37 |
| 2007/0136177 | A1 * | 6/2007 | Reeth ............... | G06Q 30/08 705/37 |
| 2008/0059382 | A1 * | 3/2008 | Burczyk ............... | G06Q 40/00 705/37 |
| 2010/0191639 | A1 * | 7/2010 | Johnson ............... | G06Q 40/04 705/37 |
| 2011/0055112 | A1 * | 3/2011 | Haines ............... | G06Q 40/06 705/36 R |
| 2017/0178237 | A1 * | 6/2017 | Wong ............... | G06Q 40/04 |
| 2017/0243175 | A1 * | 8/2017 | Gramowski ....... | G06Q 20/3276 |
| 2020/0160288 | A1 * | 5/2020 | Bauerschmidt ........ | G06Q 20/06 |
| 2021/0142407 | A1 * | 5/2021 | Rudolph ............... | G06Q 40/04 |

FOREIGN PATENT DOCUMENTS

| | | | | |
|---|---|---|---|---|
| KR | 102016861 | B1 * | 8/2019 | ............ G06Q 20/06 |
| KR | 102146133 | B1 * | 8/2020 | ............ G06Q 40/06 |
| KR | 102146134 | B1 * | 8/2020 | ............ G06Q 20/06 |

OTHER PUBLICATIONS

Steven et al.: What are Bitcoin Futures and How Do They Work?, Nov. 16, 2020, pp. 1-16 (Year: 2020).*

* cited by examiner

Primary Examiner — Bijendra K Shrestha
(74) Attorney, Agent, or Firm — Barry Choobin; Patent 360

(57) ABSTRACT

A trading platform for transacting financial instruments, and in particular the derivatives having an execution date and a later maturity date. The trading platform combines the advantages of derivatives trading and virtual currency to increase earnings.

4 Claims, 3 Drawing Sheets

SYSTEM AND METHOD FOR PAYMENTS IN FINANCIAL INSTRUMENT'S TRADE

CROSS-REFERENCE TO RELATED APPLICATIONS

This application claims priority to the U.S. provisional patent application Ser. No. filed 63/134,853, filed on Jan. 7, 2021, which is incorporated herein by reference in its entirety.

FIELD OF INVENTION

The present invention relates to a trading platform, and more particularly the present invention relates to a payment interface in the trading platform.

BACKGROUND

The coinage system replaced the ancient barter system, and the currency system replaced the coinage system. The currency replaces the drawbacks of the barter system and coinage system. Currency is a primary means of exchanging assets or services. The currency is valued based on a set of rules. The form of currency is decided by the government of a nation that prints and distributes the currency. A country can adopt any form of currency that can be valued against the currencies of the other nation. Typically, each country has its form of currency which is typically in a physical format.

The physical currency is having many limitations, particularly, localization, boundaries, and taxation. Presently, the financial instruments including the derivatives are traded in legal or national currencies only, which limits the scope of trading and earnings.

A desire is there for a trading platform that overcomes the limitation of the known physical/national currencies in the trading of financial instruments.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a trading platform for financial instruments, and particularly for trading in futures. The disclosed platform overcomes the limitation of national currencies for trading in futures and provides for an increase in earnings for both the futures buyer and seller. Trading in futures is known in the art and generally refers to an agreement between a seller and buyer for transacting an asset at a future date at an agreed-upon price. Also known are virtual currencies, such as Bitcoin that overcomes certain limitation of the national currency such as boundaries. Disclosed trading platform combining the advantages of futures trading and bitcoin to increase the earnings and commissions.

Figure 1:
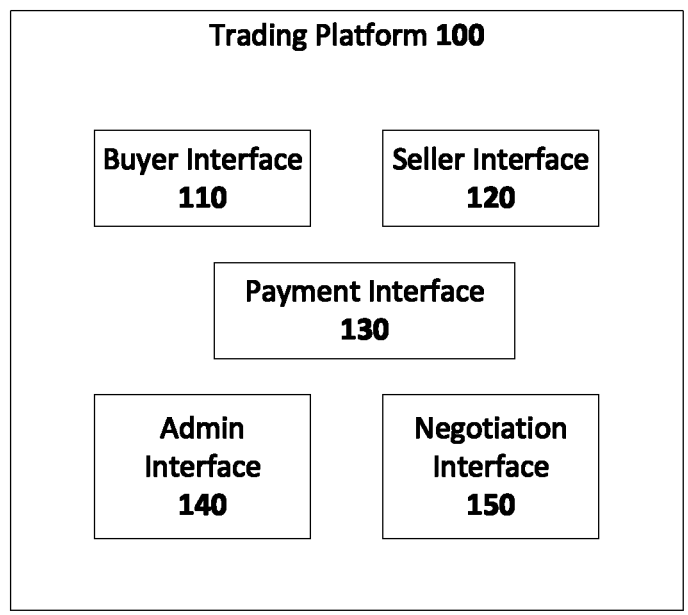
FIG. 1 is a block diagram of the disclosed trading platform, according to an exemplary embodiment of the present invention.

Referring to FIG. 1, which discloses an exemplary embodiment of the disclosed trading platform 100. The trading platform 100 can include a buyer interface 110, a seller interface 120, and a payment interface 130. A user can register as a buyer or seller or both on the disclosed trading platform. The user can provide his basic details, such as name and contact details. Once registered, the profiles of the users can be created and stored in a database of the trading platform. Each user in the database can be assigned a unique id that can be used to associate the transactions with the user. The payment interface allows users to link their wallets from virtual currency transaction and permits paying for the transactions using the virtual currency.

The seller interface and the buyer interface can allow the users to trade in futures. The disclosed trading platform provides for the execution of the contracts and storing them in the database. The disclosed platform may also provide for determining the value of a contract at an execution date and the maturity date. The profit can be determined by the system using the values of the contract and the bitcoins at the time of maturity in comparison with the values at the time of executing the transaction. With profit, the commission can also be calculated by the trading platform. Table 1 illustrates an exemplary embodiment of commission rates for futures trading.

TABLE 1

The commission in Futures Trading:

| Profit Level | Level 1 | Level 2 | Level 3 | Level 4 |
|---|---|---|---|---|
| Profit rate | Under 0% | 0-10% | 10-20% | 20-30% |
| Commission | 0% | 1% | 2% | 3% |

It can be seen in Table 1, that the commission is charged only when there is profit in the trade. The below example further illustrates the trade.

TABLE 2

Transaction Detail: Ethereum 100 ea/Contract Date:

| Bitcoin | Value at contract date | Value at maturity | Profit | Profit Level | Commission |
|---|---|---|---|---|---|
| Seller | $45,000 | $55,000 | -$10,000 | 1 | 0 |
| Buyer | $45,000 | $55,000 | $10,000 | 4 | $300 |

It is to be understood that different futures contract and similar derivatives are within the scope of the present invention. Moreover, other financial instruments, such as stocks and options can also be traded in the disclosed trading platform.

The disclosed platform can permit different virtual currencies for trading in financial instruments. For example, Bitcoin, Ethereum, Cava, Bitcoin and virtual currencies traded in the market are within the scope of the present invention. Moreover, the disclosed trading platform can be connected to virtual currency exchanges, such as Bitsum, Upbit, CoinOne, and Coinbit, for near real-time values of currencies and exchange.

Different products can be traded on the disclosed platform and new products can also be registered. The registered futures products provided by a subscriber is purchased by another applicant by using his bitcoin or other virtual currencies and then a contract can be executed. Examples of products that can be traded as derivatives can be fundamental assets including, Jewelry, Agricultural Products, Livestock Products, Energy, Stock, Currency, Option, Bitcoin etc. Real estate assets can also be traded including Buildings, Commercial Properties, Houses/Condos etc.

The seller interface may permit the products of the future to be registered for sale by the seller. The details of the futures product, such as the name of the product, sale volume, sale price and maturity date can be made available with a unique serial number. Each listing can be associated with this unique serial number and the transaction can be tracked using the unique serial number. The listings can be made available at the buyer interface permitting the buyer to navigate through the listings, place an order, and like features. The buyer interface may also allow a user to search for the listings. The trading module may also include an admin 140 interface that allows the admin of the trading platform to interact with the trading platform. The trading module may allow the admin to set the commission, register and verify the users and listing on the trading platform. The admin also provides for executing the orders, sending notifications, settling the transactions between the buyer and the seller, calculating the profit and commission, configuring known and new currencies with the trading platform, and like operation for executing a transaction of financial instrument.

Disclosed trading platform combined with the virtual currency payment can be provided with four different types of investment algorithm of ++, +−, −+, − if profits and loss of buyers and seller are combined.

Figure 2:
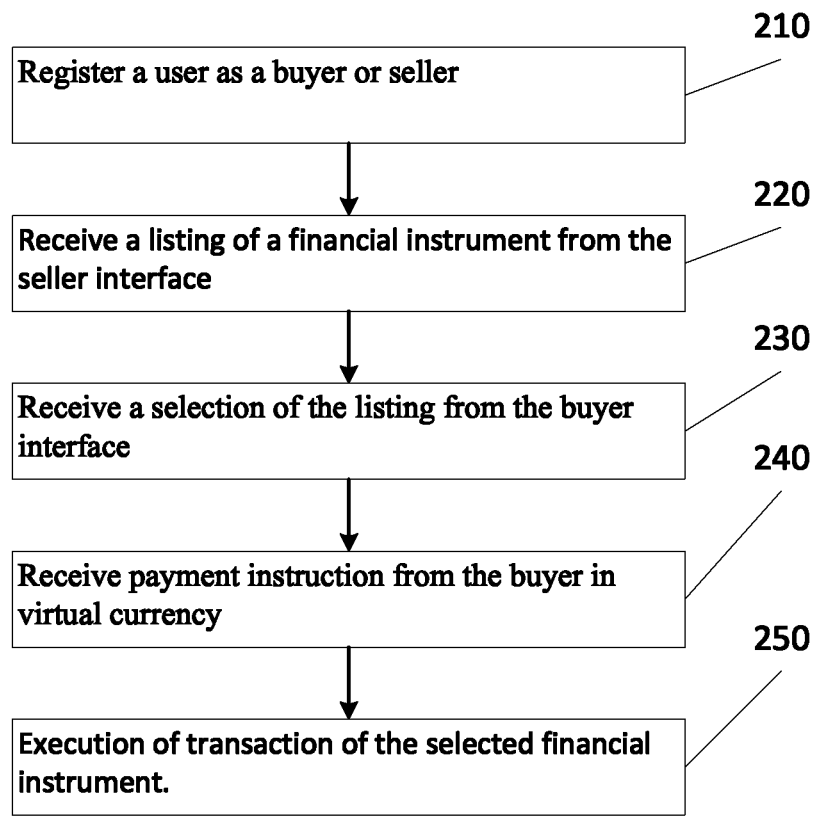
FIG. 2 is a flow chart illustrating an exemplary embodiment of the trading platform, according to the present invention.

Referring to FIG. 2 which is a flow chart showing an exemplary embodiment of a method executed by the disclosed trading platform. At first, the trading platform through either the seller interface or the buyer interface can register a user as a buyer or seller, at step 210. Thereafter, the seller can list one or more listings i.e., derivatives to be traded on the seller interface, at step 220. The trading platform can receive the listings and assign a unique serial number to each listing. The listings can be stored in the database. The seller interface can provide a suitable form to receive details of the contract to be listed including its value, maturity date and like. The trading platform can provide the available listings on the buyer interface. A buyer can navigate through the listings or search desired listings. The trading platform can receive a selection of listing from the buyer interface, at step 230. The trading platform can also receive a payment instruction from the buyer in virtual currency, at step 240. The transaction can then be executed at step 250 and the trading platform can determine the profits based on the contract value at the maturity date and the change in the value of the locked amount of virtual currency. The trading platform can also determine the commission based on the amount of the virtual currency.

A trading platform for transacting financial instruments, the trading platform comprises a seller interface configured to receive registration of a user as a seller, receive details of a financial instrument, the financial instrument having an execution date and a maturity date, wherein the maturity date is after the execution date; a buyer interface configured to receive registration of a user as a buyer, receive a selection of a financial instrument from a buyer device; a payment interface configured to: upon receiving a selection of the financial instrument, retrieve the value of a virtual currency on the execution date; upon determining the value, determine the purchase value of the selected financial instrument; and an admin interface configured to: retrieve the value of the virtual currency on the maturity date, determining a difference between the values at the maturity date and the execution date, and adding to the difference in profit. The financial instrument is a futures contract. The buyer interface is further configured to present a list of registered financial instruments for selection. The payment interface is further configured to transact ownership of the virtual currency from the buyer to the seller. The payment interface is further configured to converting a value of the virtual currency of the buyer into a virtual currency of the seller, wherein the two virtual currencies are different. A method for transacting financial instrument, the method comprising the steps of providing a buyer interface, a seller interface, an admin interface, and a payment interface; receiving, from the seller interface, one or more financial instruments for sale, the one or more financial instruments having an execution date and a maturity date; receiving, from the buyer interface, a selection of financial instrument from the one or more financial instruments; executing, by the admin interface, the transaction of the selected financial instrument through a negotiation interface; retrieving, a value of a buyer's selected virtual currency, at the execution date, by the payment interface; determining, by the admin interface, a value of the transaction based on the value of the buyer's selected virtual currency; and retrieving, a value of the buyer's selected virtual currency, at the maturity date, by the payment interface, wherein a difference in the values at the maturity date and the expiry date is added in profits of the transaction.

In one aspect, the disclosed trading platform can also provide a negotiation interface 150 which allows negotiating the transaction between the seller and potential buyers. When a buyer wished to purchase a contract, the disclosed platform can notify the sellers associated with the listed contract. The negotiation can then be facilitated by the negotiation interface of the disclosed trading platform. Any settlement reached in a negotiation can be registered by a system with the payment from the buyer. The payment interface can allow paying in different virtual currencies. In case, the seller may not accept the currency of payment from the buyer, the disclosed payment interface can also provide for conversion between different virtual currencies. Upon execution of the transaction on reaching maturity, the trading platform can determine the value and commission. The commission can be deducted from the locked amount and the remaining amount can be transferred to the seller account associated with the disclosed platform. The commission can be charged on the profits at a rate agreed with the parties in a transaction. The disclosed trading platform can execute the transfer of virtual currency from the buyer to the seller for different virtual currencies known to be traded publicly.

Figure 3:
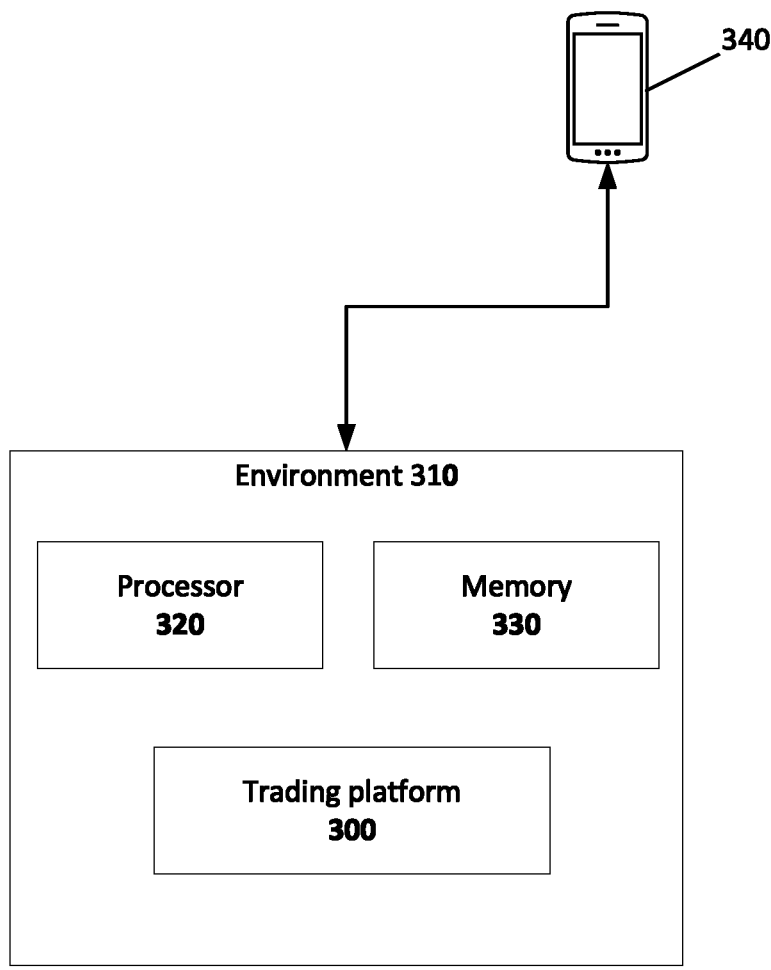
FIG. 3 is an environmental diagram of the trading platform, according to an exemplary embodiment of the present invention.

Referring to FIG. 3 which is an environment diagram of the disclosed trading platform. The trading platform 300 can be executed in a processing environment 310 having a processor 320 and a memory 330. The environment can include one or more interconnected servers connected to a database. One or more servers can be located in the same place or dispersed in different locations. One or more servers can also be cloud servers known to a skilled person. The seller interface, the buyer interface, the negotiation interface, and the payment interface can be presented to user devices 340. It is to be understood that FIG. 3 shows only one user device, but several user devices can simultaneously connect with the disclosed platform, wherein the user device can have the buyer interface or the seller interface.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A trading platform for transacting futures contracts, the trading platform comprises a processor and a memory, the trading platform comprising steps of which are executed by the processor:
   providing a seller interface which upon execution by the processor is configured to:
      receive registration of a user as a seller,
      receive details of a contract, the contract has an execution date and a maturity date, wherein the maturity date is after the execution date;
   providing a buyer interface which upon execution by the processor is configured to:
      receive registration of a user as a buyer,
      receive a selection of a contract from a buyer device;
   providing a payment interface which upon execution by the processor is configured to:
      cause linking virtual currency wallets of the seller and buyer and permitting payment in virtual currency, transacting ownership of the virtual currency from the buyer to the seller, and converting a value of the virtual currency of the buyer into a virtual currency of the seller, wherein the two virtual currencies are different;
      upon receiving the selection of the contract, retrieve a first value of a virtual currency on the execution date,
      upon determining the first value, determine a first value of the contract on the execution date; and
   providing an admin interface which upon execution by the processor is configured to:
      retrieve a second value of the virtual currency on the maturity date,
      determine the second value of the contract on the maturity date, and
      determine a profit based on differences between the second value and the first value of the virtual currency, and between the second value and the first value of the contract;
      change a value of locked amount of the virtual currency based on the profit, deducting a commission at an agreed rate from the locked amount of the virtual currency and transferring the virtual currency from the buyer to the seller for different virtual currency known to be traded publicly.

2. The trading platform according to claim 1, wherein the buyer interface is further configured to present a list of registered financial instruments for selection.

3. A method for transacting futures contract, the method implemented within a system comprising a processor and a memory, the method comprising steps of which are executed by the processor:
   providing a buyer interface, a seller interface, an admin interface, and a payment interface, the buyer interface, the seller interface, the admin interface, and the payment interface implemented in the system and configured to be executed by the processor;
   wherein the payment interface upon execution by the processor is configured to:
      cause linking virtual currency wallets of the seller and buyer and permitting payment in virtual currency, transacting ownership of the virtual currency from the buyer to the seller, and converting a value of the virtual currency of the buyer into a virtual currency of the seller, wherein the two virtual currencies are different;
   receiving, from the seller interface, one or more contracts for sale, the one or more contracts has an execution date and a maturity date;
   receiving, from the buyer interface, a selection of a contract from the one or more contracts;
   executing, by the admin interface, a transaction of the selected contract through a negotiation interface;
   retrieving, a first value of a buyer's selected virtual currency, on the execution date, by the payment interface;
   determining, by the payment interface, a first value of the transaction;
   retrieving, a second value of the virtual currency and a second value of the transaction on the maturity date, by the admin interface; and;
   determining, by the admin interface a profit as a difference based on the first value and the second value of the virtual currency and the first value and the second value of the transaction, changing a value of locked amount of the virtual currency based on the profit, deducting a commission from the locked amount of the virtual currency and transferring the virtual currency from the buyer to the seller for different virtual currency known to be traded publicly.

4. The method according to claim 3, wherein the method further comprises the step of transacting ownership of the virtual currency from the buyer to the seller.

* * * * *